(12) United States Patent
Biler et al.

(10) Patent No.: US 8,824,121 B2
(45) Date of Patent: Sep. 2, 2014

(54) CONDUCTIVE POLYMER COATING FOR WET ELECTROLYTIC CAPACITOR

(75) Inventors: Martin Biler, Lanskroun (CZ); Dirk H. Dreissig, Myrtle Beach, SC (US); Frantisek Priban, Zabreh (CZ); Jan Petrzilek, Orlici (CZ)

(73) Assignee: AVX Corporation, Fountain Inn, SC (US)

( * ) Notice: Subject to any disclaimer, the term of this patent is extended or adjusted under 35 U.S.C. 154(b) by 378 days.

(21) Appl. No.: 13/192,509

(22) Filed: Jul. 28, 2011

(65) Prior Publication Data

US 2012/0069490 A1 Mar. 22, 2012

Related U.S. Application Data

(60) Provisional application No. 61/383,438, filed on Sep. 16, 2010.

(51) Int. Cl.
*H01G 9/04* (2006.01)
*H01G 9/145* (2006.01)

(52) U.S. Cl.
USPC .......................................................... 361/516

(58) Field of Classification Search
USPC .................................... 361/516, 508, 503
See application file for complete search history.

(56) References Cited

U.S. PATENT DOCUMENTS

| | | |
|---|---|---|
| 5,300,575 A | 4/1994 | Jonas et al. |
| 5,369,547 A | 11/1994 | Evans |
| 5,457,862 A | 10/1995 | Sakata et al. |
| 5,469,325 A | 11/1995 | Evans |
| 5,473,503 A | 12/1995 | Sakata et al. |
| 5,729,428 A | 3/1998 | Sakata et al. |
| 5,737,181 A | 4/1998 | Evans |
| 5,754,394 A | 5/1998 | Evans et al. |
| 5,786,980 A | 7/1998 | Evans |
| 5,982,609 A | 11/1999 | Evans |
| 6,094,339 A | 7/2000 | Evans |

(Continued)

FOREIGN PATENT DOCUMENTS

| | | |
|---|---|---|
| JP | 3004512 A | 1/1991 |
| JP | 2001110685 A | 4/2001 |

OTHER PUBLICATIONS

Article—Carlberg, et al., "Poly(3,4-ethylenedioxythiophene) as Electrode Material in Electrochemical Capacitors," *J. Electrochem. Soc.*, vol. 144, No. 4, Apr. 1997, pp. L61-L64.

(Continued)

*Primary Examiner* — David M Sinclair
(74) *Attorney, Agent, or Firm* — Dority & Manning, P.A.

(57) ABSTRACT

A wet electrolytic capacitor including a porous anode body containing a dielectric layer, a cathode containing a metal substrate on which is disposed a conductive polymer coating, and an electrolyte is provided. The conductive polymer coating is in the form of a dispersion of particles having an average diameter of from about 1 to about 500 nanometers, in some embodiments from about 5 to about 400 nanometers, and in some embodiments, from about 10 to about 300 nanometers. The relatively small size of the particles used in the coating increases the surface area that is available for adhering to the metal substrate, which in turn improves mechanical robustness and electrical performance (e.g., reduced equivalent series resistance and leakage current). Another benefit of employing such a dispersion for the conductive polymer coating is that it may be able to better cover crevices of the metal substrate and improve electrical contact.

26 Claims, 2 Drawing Sheets

(56) References Cited

U.S. PATENT DOCUMENTS

| | | | |
|---|---|---|---|
| 6,307,735 B1 * | 10/2001 | Saito et al. ............... | 361/517 |
| 6,576,524 B1 | 6/2003 | Evans et al. | |
| 6,594,140 B1 | 7/2003 | Evans et al. | |
| 6,707,660 B1 | 3/2004 | Evans et al. | |
| 6,721,169 B2 | 4/2004 | Melody et al. | |
| 6,721,170 B1 | 4/2004 | Evans et al. | |
| 6,801,424 B1 * | 10/2004 | Nielsen et al. ............ | 361/517 |
| 6,965,509 B2 | 11/2005 | Reynolds et al. | |
| 6,987,663 B2 | 1/2006 | Merker et al. | |
| 7,099,143 B1 | 8/2006 | Fife et al. | |
| 7,118,690 B2 | 10/2006 | Wessling et al. | |
| 7,154,740 B2 | 12/2006 | Merker et al. | |
| 7,169,284 B1 | 1/2007 | Jiang et al. | |
| 7,224,576 B2 | 5/2007 | Hossick-Schott | |
| 7,256,982 B2 | 8/2007 | Lessner et al. | |
| 7,279,015 B2 | 10/2007 | Merker | |
| 7,314,685 B2 | 1/2008 | Brown et al. | |
| 7,341,801 B2 | 3/2008 | Reuter et al. | |
| 7,342,774 B2 | 3/2008 | Hossick-Schott et al. | |
| 7,377,947 B2 | 5/2008 | Merker et al. | |
| 7,402,183 B1 | 7/2008 | Jiang | |
| 7,411,779 B2 | 8/2008 | Merker et al. | |
| 7,456,073 B2 | 11/2008 | Fife et al. | |
| 7,480,130 B2 | 1/2009 | Fife et al. | |
| 7,511,943 B2 | 3/2009 | Fife et al. | |
| 7,515,396 B2 | 4/2009 | Biler | |
| 7,563,290 B2 | 7/2009 | Qiu et al. | |
| 7,667,954 B2 | 2/2010 | Lessner et al. | |
| 7,859,829 B2 | 12/2010 | Kakuma et al. | |
| 7,973,180 B2 | 7/2011 | Morita et al. | |
| 8,023,250 B2 | 9/2011 | Ning et al. | |
| 8,058,135 B2 | 11/2011 | Merker et al. | |
| 2006/0028786 A1 * | 2/2006 | Norton et al. ............. | 361/517 |
| 2007/0064376 A1 | 3/2007 | Merker et al. | |
| 2008/0232029 A1 * | 9/2008 | Ning ........................ | 361/503 |
| 2008/0232032 A1 * | 9/2008 | Jones et al. ............... | 361/509 |
| 2009/0144954 A1 * | 6/2009 | Furusawa et al. ......... | 29/25.03 |
| 2010/0142124 A1 | 6/2010 | Dreissig et al. | |
| 2010/0238608 A1 | 9/2010 | Dreissig et al. | |
| 2010/0265634 A1 | 10/2010 | Freeman et al. | |
| 2010/0302709 A1 | 12/2010 | Dreissig et al. | |
| 2011/0019339 A1 | 1/2011 | Merker et al. | |
| 2011/0024692 A1 | 2/2011 | Loevenich et al. | |
| 2012/0063063 A1 | 3/2012 | Qiu et al. | |
| 2012/0069491 A1 | 3/2012 | Biler | |
| 2012/0069492 A1 | 3/2012 | Biler et al. | |

OTHER PUBLICATIONS

Article—Groenendaal et al., "Poly(3,4-ethylenedioxythiophene) and Its Derivatives: Past, Present and Future," *Advanced Materials*, Dec. 27, 1999, 14 pages.

Article—Naoi et al., "Advanced Polymers as Active Materials and Electrolytes for Electrochemical Capacitors and Hybrid Capacity Systems," *The Electrochemical Society* Interface, Spring 2008, 5 pages.

Article—Visco et al., "A Novel Class of Organosulfur Electrodes for Energy Storage," *J. Electrochem. Soc.*, vol. 136, No. 3, Mar. 1989, pp. 661-665.

Product Information from H.C. Starck on BAYTRON® P—Conductive Polymr Products, Baytronics, 2006, 3 pages.

Paper—Wet Electrolyte Tantalum Capacitors from Vishay, Sep. 1, 2003, 4 pages, www.vishay.com.

Paper—Wet Tantalum Capacitors Sintered Anode TANTALEX® Capacitors for Operation to + 125° C, Elastomer-Sealed from Vishay, Jun. 19, 2007, 5 pages, www.vishay.com.

Paper—Guide to prepare In-Situ-PEDT-Layers from H.C. Starck, 2008, 2 pages.

Paper—Aldissi et al., "Conducting Polymers in Ultracapacitor Applications," Presented at Conference Proceedings at ANTEC '98, Atlanta, Georgia, Apr. 26-Apr. 30, 1998, 6 pages.

Paper—Čespiva et al., "Tantalum Hybrid® Capacitors—The Capacitors with the Highest Available Power Density in Medium Voltage Range," Dec. 2009, 15 pages.

Paper—Edson et al., "Electrical Properties of a Novel High CV Wet Tantalum Capacitor System," CARTS USA Mar. 30-Apr. 2, 2009, Jacksonville, Florida, 11 pages.

Paper—Ennis et al., "Recent Advances in High Voltage, High Energy Capacitor Technology," General Atomics Energy Products Engineering Bulletin, $16^{th}$ IEEE International Pulsed Power Conference, Jun. 2007, Albuquerque, New Mexico.

Paper—Evans, "High Energy Density Electrolytic-Electrochemical Hybrid Capacitor," Presented to the $14^{th}$ Capacitor and Resistor Technology Symposium, Mar. 22, 1994, and published in CARTS '94 Proceedings, 6 pages.

Paper—Evans et al., "Performance of Mil-Type Hybrid Tantalum Capacitors," Presented at the $15^{th}$ Capacitor and Resistor Technology Symposium (CARTS), Mar. 13-16, 1996, 9 pages.

Paper—Freeman et al., "Reliability and Critical Applications of Tantalum Capacitors," 2007 Eletronics Components, Assemblies, and Materials Association, Arlington, VA, USA, Proceedings CARTS Europe 2007 Symposium, Oct.-Nov. 2007, Barcelona, Spain, pp. 193-204.

Paper—Merker et al., "New Conducting Polymer Dispersions for Solid Electrolytic Capacitors," CARTS Europe 2005, Oct. 17-20, 2005, Prague, CZ Republic, 6 pages.

Paper—Merker et al., "Tuning Conducting Polymer Dispersions for High-CV Tantalum Capacitors," CARTS Europe Oct. 29-Nov. 1, 2007, Barcelona, Spain, 6 pages.

Paper—Rudge et al., "Conducting Polymers as Active Materials in Electrochemical Capacitors," Dec. 1993, 38 pages.

Paper—Rudge et al., "Scheme for the Use of Conducting Polymers as Active Materials in Electrochemical Supercapacitors," 1993, 12 pages.

Paper—Sautter, Baytron® and Ampertron®: Conductive and Semiconductive Materials for OLED and Organic Electronics Applications, Dec. 17, 2007, 33 pages.

Search Report for GB1113377.4 dated Dec. 12, 2011, 3 pages.

Abstract of Japanese Patent—JP3004512, Jan. 10, 1991, 1 page.

Abstract of Japanese Patent—JP2001110685, Apr. 20, 2001, 1 page.

* cited by examiner

CONDUCTIVE POLYMER COATING FOR WET ELECTROLYTIC CAPACITOR

CROSS REFERENCE TO RELATED APPLICATIONS

The present application claims benefit of U.S. Provisional Application Ser. No. 61/383,438 having a filing date of Sep. 16, 2010.

BACKGROUND OF THE INVENTION

Wet capacitors are increasingly being used in the design of circuits due to their volumetric efficiency, reliability, and process compatibility. Wet capacitors typically have a larger capacitance per unit volume than certain other types of capacitors, making them valuable in high-current, high power and low-frequency electrical circuits. One type of wet capacitor that has been developed is a wet electrolytic capacitor that includes a valve metal anode, a cathode, and a liquid electrolyte. The unit cell voltage in this type of capacitor is generally higher due to the formation of a dielectric metal oxide film over the anode surface. Wet electrolytic capacitors tend to offer a good combination of high capacitance with low leakage current. Another type of wet capacitor is a wet symmetric capacitor in which the anode and cathode are similar in terms of structure and composition. The unit cell voltage in this type of capacitor is generally low due to the inevitable decomposition of the electrolyte at high voltage. Whether electrolytic or symmetric, however, the cathodes of wet capacitors typically include a substrate and a coating that provides high capacitance through a faradic or non-faradic mechanism. Conventional coatings include activated carbon, metal oxides (e.g., ruthenium oxide), and the like. Unfortunately, however, the coatings can become easily detached under certain conditions, such as in the presence of aqueous electrolytes.

As such, a need remains for a high voltage wet electrolytic capacitor that possesses good mechanical robustness and electrical performance.

SUMMARY OF THE INVENTION

In accordance with one embodiment of the present invention, a wet electrolytic capacitor is disclosed that comprises a porous anode body that contains a dielectric layer formed by anodic oxidation, a cathode, and an electrolyte disposed in electrical contact with the cathode and the anode body. The cathode comprises a micro-roughened metal substrate that contains a plurality of pits, wherein a conductive polymer coating is disposed on the micro-roughened substrate that comprises a dispersion of particles having an average diameter of from about 1 to about 500 nanometers, wherein the particles comprise a substituted polythiophene.

Other features and aspects of the present invention are set forth in greater detail below.

BRIEF DESCRIPTION OF THE DRAWINGS

A full and enabling disclosure of the present invention, including the best mode thereof to one skilled in the art, is set forth more particularly in the remainder of the specification, including reference to the accompanying figures, in which.

Repeat use of reference characters in the present specification and drawings is intended to represent the same or analogous features or elements of the present invention.

DETAILED DESCRIPTION OF REPRESENTATIVE EMBODIMENTS

It is to be understood by one of ordinary skill in the art that the present discussion is a description of exemplary embodiments only, and is not intended as limiting the broader aspects of the present invention.

Generally speaking, the present invention is directed to a wet electrolytic capacitor that includes a porous anode body containing a dielectric layer, a cathode containing a metal substrate on which is disposed a conductive polymer coating, and an electrolyte. The conductive polymer coating is in the form of a dispersion of particles having a relatively small size, such as an average diameter of from about 1 to about 500 nanometers, in some embodiments from about 5 to about 400 nanometers, and in some embodiments, from about 10 to about 300 nanometers. The $D_{90}$ value of the particles (particles having a diameter of less than or equal to the $D_{90}$ value constitute 90% of the total volume of all of the solid particles) may be about 15 micrometers or less, in some embodiments about 10 micrometers or less, and in some embodiments, from about 1 nanometer to about 8 micrometers. The diameter of the particles may be determined using known techniques, such as by ultracentrifuge, laser diffraction, etc. The relatively small size of the particles used in the coating increases the surface area that is available for adhering to the metal substrate, which in turn improves mechanical robustness and electrical performance (e.g., reduced equivalent series resistance and leakage current). Another benefit of employing such a dispersion for the conductive polymer coating is that it may be able to better cover crevices of the metal substrate and improve electrical contact.

Various embodiments of the present invention will now be described in more detail.

I. Cathode

A. Metal Substrate

The metal substrate of the cathode may include any metal, such as tantalum, niobium, aluminum, nickel, hafnium, titanium, copper, silver, steel (e.g., stainless), alloys thereof (e.g., electrically conductive oxides), composites thereof (e.g., metal coated with electrically conductive oxide), and so forth. Titanium and tantalum, as well as alloys thereof, are particularly suitable for use in the present invention. The geometric configuration of the substrate may generally vary as is well known to those skilled in the art, such as in the form of a container, can, foil, sheet, screen, mesh, etc. In one embodiment, for example, the metal substrate forms a casing having a generally cylindrical shape. It should be understood, however, that any geometric configuration may be employed in the present invention, such as D-shaped, rectangular, triangular, prismatic, etc. The casing may optionally include a lid that covers the anode and electrolyte, which may be formed from the same or different material than the casing.

Regardless of its particular form, the substrate is micro-roughened. Micro-roughening may form a plurality of pits in a surface of the substrate, thereby increasing its surface area and increasing the degree to which the conductive polymer is able to adhere thereto. In one embodiment, for instance, the surface of the metal substrate may be abrasive blasted by propelling a stream of abrasive media against at least a portion of a surface thereof. Among other things, this physically stresses and deforms the surface to create the pits. Further, abrasive blasting may distribute the pits in a substantially uniform manner so that the surface is generally smooth on a macroscopic level. The surface area of the substrate may also be increased. For instance, the area of the surface of the substrate prior to roughening may range from about 0.05 to about 5 square centimeters, in some embodiments from about 0.1 to about 3 square centimeters, and in some embodiments, from about 0.5 to about 2 square centimeters. The ratio of the area of the micro-roughened surface to that of the initial surface (prior to micro-roughening) may likewise be from about 1 to about 5, and in embodiments, from about 1.1 to about 3. The increase in surface area can allow for increased cathode capacitance for a given size and/or capacitors with a reduced size for a given capacitance.

Figure 2:
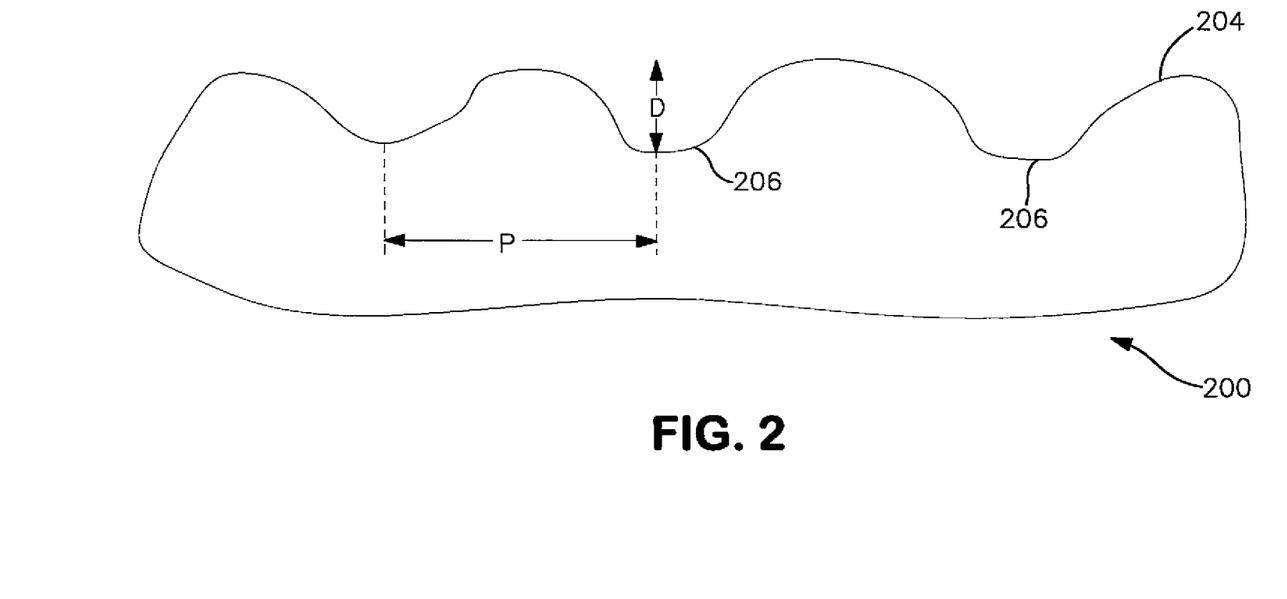
FIG. 2 is a cross-sectional view of one embodiment of a micro-roughened metal substrate that may be employed in the present invention.

Referring to FIG. 2, for example, one embodiment of a metal substrate 200 is shown that has been abrasive blasted to form a micro-roughened surface 204 having a plurality of pits 206. The relative size and spacing of the pits 206 may vary depending on the desired properties for the capacitor. For example, the average depth ("D") of the pits 206 may be from about 200 to about 2500 nanometers, in some embodiments from about 300 to about 2000 nanometers, and in some embodiments, from about 500 to about 1500 nanometers. Likewise, adjacent pits 206 may be spaced apart a "peak-to-peak" distance ("P") that ranges from about 20 to about 500 micrometers, in some embodiments from about 30 to about 400 micrometers, in some embodiments, from about 50 to about 200 micrometers. The number of pits 206 may also be high enough to produce the desired increase in surface area. For example, the surface may possess from 1 to 20, in some embodiments, from 2 to 15, and in some embodiments, from 3 to 10 pits per 100 square micrometers. The pits 206 may be disposed uniformly or non-uniformly across the surface 202. For example, the pits 206 may be present in a spaced-apart fashion over the surface so that they form "island-like" structures. It should be understood that the entire surface of the substrate need not be abraded. In fact, in certain embodiments, it may be desired to only abrade a portion of the metal substrate so that the remaining portion is relatively smooth for attaching a sealing mechanism. For example, a portion of the substrate may be covered by a masking device (e.g., ferrule, tape, etc.) during abrasion so that the pits are formed only in the desired locations. When employing a cylindrical substrate, for instance, it may be desirable to use a generally cylindrical, hollow ferrule to mask a top portion of the substrate.

The methods employed to abrasively blast the surface may be selectively controlled to achieve the desired features. Suitable methods may include, for example, sandblasting, bead blasting, pellet blasting, etc. The abrasive media employed in such methods may vary and include, for example, ceramic particles, metal particles, polymeric particles, liquids (e.g., water), etc. Sandblasting is particularly suitable for use in the present invention and generally involves propelling a stream of ceramic media (e.g., silicon carbide, aluminum oxide, titanium dioxide, etc.) through a nozzle and against the surface of the substrate. The size of the abrasive media may be selected based on the type of substrate, the pressure employed, and the desired qualities of the finished substrate. For example, the abrasive media may have an average size of from about 20 micrometers to about 150 micrometers. Further, the pressure and time that the abrasive media is propelled toward the surface may range from about 1 to about 50 pounds per square inch, and in some embodiments from about 10 to about 35 pounds per square inch, for a time period of from about 1 to about 50 seconds, in some embodiments from about 5 to about 40 seconds, and in some embodiments from about 10 to about 30 seconds. At such conditions, the distance that the injection nozzle is spaced from the surface of the metal substrate may also be controlled to achieve the desired pit formation, such as from about 0.1 to about 5 inches from the surface of the substrate. The nozzle may be stationary or it may be moved relative to the substrate during application of the abrasive media. When blasting the interior surface of a cylindrical casing, for example, the nozzle may be rotated or remain stationary while the casing is rotated. One or more blasting steps may generally be employed. Once complete, any abrasive media remaining on the surface of the metal substrate is typically removed, such as by washing the substrate.

B. Conductive Polymer Coating

As indicated above, a dispersion of particle is applied the micro-roughened surface of the metal substrate to form a conductive coating. The particles contain a substituted polythiophene that is π-conjugated and has intrinsic electrical conductivity (e.g., electrical conductivity of at least about 1 µS cm$^{-1}$). In one particular embodiment, the substituted polythiophene has recurring units of general formula (I), formula (II), or both:

wherein,

A is an optionally substituted $C_1$ to $C_5$ alkylene radical (e.g., methylene, ethylene, n-propylene, n-butylene, n-pentylene, etc.);

R is a linear or branched, optionally substituted $C_1$ to $C_{18}$ alkyl radical (e.g., methyl, ethyl, n- or iso-propyl, n-, iso-, sec- or tert-butyl, n-pentyl, 1-methylbutyl, 2-methylbutyl, 3-methylbutyl, 1-ethylpropyl, 1,1-dimethylpropyl, 1,2-dimethylpropyl, 2,2-dimethylpropyl, n-hexyl, n-heptyl, n-octyl, 2-ethylhexyl, n-nonyl, n-decyl, n-undecyl, n-dodecyl, n-tridecyl, n-tetradecyl, n-hexadecyl, n-octadecyl, etc.); optionally substituted $C_5$ to $C_{12}$ cycloalkyl radical (e.g., cyclopentyl, cyclohexyl, cycloheptyl, cyclooctyl, cyclononyl cyclodecyl, etc.); optionally substituted $C_6$ to $C_{14}$ aryl radical (e.g., phenyl, naphthyl, etc.); optionally substituted $C_7$ to $C_{18}$ aralkyl radical (e.g., benzyl, o-, m-, p-tolyl, 2,3-, 2,4-, 2,5-, 2-6,3-4-, 3,5-xylyl, mesityl, etc.); optionally substituted $C_1$ to $C_4$ hydroxyalkyl radical, or hydroxyl radical; and x is an integer from 0 to 8, in some embodiments, from 0 to 2, and in some embodiments, x is 0. Example of substituents for the radicals "A" or "R" include, for instance, alkyl, cycloalkyl, aryl, aralkyl, alkoxy, halogen, ether, thioether, disulphide, sulfoxide, sulfone, sulfonate, amino, aldehyde, keto, carboxylic acid ester, carboxylic acid, carbonate, carboxylate, cyano, alkylsilane and alkoxysilane groups, carboxyamide groups, and so forth.

The total number of recurring units of general formula (I) or formula (II) or of general formulae (I) and (II) is typically from 2 to 2,000, and in some embodiments, from 2 to 100.

Particularly suitable substituted polythiophenes are those in which "A" is an optionally substituted $C_2$ to $C_3$ alkylene radical and x is 0 or 1. In one particular embodiment, the substituted polythiophene is poly(3,4-ethylenedioxythiophene) ("PEDT"), which has recurring units of formula (II), wherein "A" is $CH_2$—$CH_2$ and "x" is 0. The monomers used to form such polymers may vary as desired. For instance, particularly suitable monomers are substituted 3,4-alkylenedioxythiophenes having the general formula (III), (IV), or both:

(III)

(IV)

wherein, A, R, and X are as defined above.

Examples of such monomers include, for instance, optionally substituted 3,4-ethylenedioxythiophenes. One commercially suitable example of 3,4-ethylenedioxthiophene is available from H.C. Starck GmbH under the designation Clevios™ M. Derivatives of these monomers may also be employed that are, for example, dimers or trimers of the above monomers. Higher molecular derivatives, i.e., tetramers, pentamers, etc. of the monomers are suitable for use in the present invention. The derivatives may be made up of identical or different monomer units and used in pure form and in a mixture with one another and/or with the monomers. Oxidized or reduced forms of these precursors may also be employed.

The thiophene monomers, such as described above, may be chemically polymerized in the presence of an oxidative catalyst. The oxidative catalyst typically includes a transition metal cation, such as iron(III), copper(II), chromium(VI), cerium(IV), manganese(IV), manganese(VII), ruthenium (III) cations, etc. A dopant may also be employed to provide excess charge to the conductive polymer and stabilize the conductivity of the polymer. The dopant typically includes an inorganic or organic anion, such as an ion of a sulfonic acid. In certain embodiments, the oxidative catalyst employed in the precursor solution has both a catalytic and doping functionality in that it includes a cation (e.g., transition metal) and anion (e.g., sulfonic acid). For example, the oxidative catalyst may be a transition metal salt that includes iron(II) cations, such as iron(III) halides (e.g., $FeCl_3$) or iron(III) salts of other inorganic acids, such as $Fe(ClO_4)_3$ or $Fe_2(SO_4)_3$ and the iron (III) salts of organic acids and inorganic acids comprising organic radicals. Examples of iron (III) salts of inorganic acids with organic radicals include, for instance, iron(III) salts of sulfuric acid monoesters of $C_1$ to $C_{20}$ alkanols (e.g., iron(III) salt of lauryl sulfate). Likewise, examples of iron (III) salts of organic acids include, for instance, iron(III) salts of $C_1$ to $C_{20}$ alkane sulfonic acids (e.g., methane, ethane, propane, butane, or dodecane sulfonic acid); iron (III) salts of aliphatic perfluorosulfonic acids (e.g., trifluoromethane sulfonic acid, perfluorobutane sulfonic acid, or perfluorooctane sulfonic acid); iron (III) salts of aliphatic $C_1$ to $C_{20}$ carboxylic acids (e.g., 2-ethylhexylcarboxylic acid); iron (III) salts of aliphatic perfluorocarboxylic acids (e.g., trifluoroacetic acid or perfluorooctane acid); iron (III) salts of aromatic sulfonic acids optionally substituted by $C_1$ to $C_{20}$ alkyl groups (e.g., benzene sulfonic acid, o-toluene sulfonic acid, p-toluene sulfonic acid, or dodecylbenzene sulfonic acid); iron (III) salts of cycloalkane sulfonic acids (e.g., camphor sulfonic acid); and so forth. Mixtures of these above-mentioned iron(III) salts may also be used. Iron(III)-p-toluene sulfonate, iron(III)-o-toluene sulfonate, and mixtures thereof, are particularly suitable. One commercially suitable example of iron(III)-p-toluene sulfonate is available from H.C. Starck GmbH under the designation Clevios™ C.

The formation of the substituted polythiophenes into a particulate form is typically enhanced by using a separate counterion to counteract the positive charge carried by the main polymer chain. In some cases, the polymer may possess positive and negative charges in the structural unit, with the positive charge being located on the main chain and the negative charge optionally on the substituents of the radical "R", such as sulfonate or carboxylate groups. The positive charges of the main chain may be partially or wholly saturated with the optionally present anionic groups on the radicals "R." Viewed overall, the polythiophenes may, in these cases, be cationic, neutral or even anionic. Nevertheless, they are all regarded as cationic polythiophenes as the polythiophene main chain has a positive charge.

The counterion may be a monomeric or polymeric anion. Polymeric anions can, for example, be anions of polymeric carboxylic acids (e.g., polyacrylic acids, polymethacrylic acid, polymaleic acids, etc.); polymeric sulfonic acids (e.g., polystyrene sulfonic acids ("PSS"), polyvinyl sulfonic acids, etc.); and so forth. The acids may also be copolymers, such as copolymers of vinyl carboxylic and vinyl sulfonic acids with other polymerizable monomers, such as acrylic acid esters and styrene. Likewise, suitable monomeric anions include, for example, anions of $C_1$ to $C_{20}$ alkane sulfonic acids (e.g., dodecane sulfonic acid); aliphatic perfluorosulfonic acids (e.g., trifluoromethane sulfonic acid, perfluorobutane sulfonic acid or perfluorooctane sulfonic acid); aliphatic $C_1$ to $C_{20}$ carboxylic acids (e.g., 2-ethyl-hexylcarboxylic acid); aliphatic perfluorocarboxylic acids (e.g., trifluoroacetic acid or perfluorooctanoic acid); aromatic sulfonic acids optionally substituted by $C_1$ to $C_{20}$ alkyl groups (e.g., benzene sulfonic acid, o-toluene sulfonic acid, p-toluene sulfonic acid or dodecylbenzene sulfonic acid); cycloalkane sulfonic acids (e.g., camphor sulfonic acid or tetrafluoroborates, hexafluorophosphates, perchlorates, hexafluoroantimonates, hexafluoroarsenates or hexachloroantimonates); and so forth. Particularly suitable counteranions are polymeric anions, such as a polymeric carboxylic or sulfonic acid (e.g., polystyrene sulfonic acid ("PSS")). The molecular weight of such polymeric anions typically ranges from about 1,000 to about 2,000,000, and in some embodiments, from about 2,000 to about 500,000.

When employed, the weight ratio of such counterions to substituted polythiophene in a given layer of the coating is typically from about 0.5:1 to about 50:1, in some embodiments from about 1:1 to about 30:1, and in some embodiments, from about 2:1 to about 20:1. The weight of the substituted polythiophene referred to above may refer to the weighed-in portion of the monomers used, assuming that a complete conversion occurs during polymerization.

Without intending to be limited by theory, it is believed that charging of the capacitor to a high voltage (e.g., greater than the formation voltage) forces ions of the electrolyte into coatings containing such substituted polythiophenes. This causes the conductive polymer to "swell" and retain the ions near the surface, thereby enhancing charge density. Because the polymer is generally amorphous and non-crystalline, it can also dissipate and/or absorb the heat associated with the high voltage. Upon discharge, it is also believed that the substituted polythiophene "relaxes" and allows ions in the electrolyte to move out of the coating. Through such swelling and relaxation mechanism, charge density near the metal substrate can be increased without a chemical reaction with the electrolyte. Accordingly, one beneficial aspect of the present invention is that mechanical robustness and good electrical performance may be provided without the need for conventional conductive coatings, such as those made from activated carbon or metal oxides (e.g., ruthenium oxide). In fact, the present inventors have discovered that excellent results may be achieved using the dispersion as the principal coating material on the metal substrate. That is, the dispersion may constitute at least about 90 wt. %, in some embodiments at least about 92 wt. %, and in some embodiments, at least about 95 wt. % of the coating(s) present on the metal substrate. Nevertheless, it should be understood that other conductive coatings may also be used in some embodiments of the present invention.

In addition to substituted polythiophenes and optional counterion(s), the dispersion may also contain one or more binders to further enhance the adhesive nature of the polymeric layer and also increase the stability of the particles within the dispersion. The binders may be organic in nature, such as polyvinyl alcohols, polyvinyl pyrrolidones, polyvinyl chlorides, polyvinyl acetates, polyvinyl butyrates, polyacrylic acid esters, polyacrylic acid amides, polymethacrylic acid esters, polymethacrylic acid amides, polyacrylonitriles, styrene/acrylic acid ester, vinyl acetate/acrylic acid ester and ethylene/vinyl acetate copolymers, polybutadienes, polyisoprenes, polystyrenes, polyethers, polyesters, polycarbonates, polyurethanes, polyamides, polyimides, polysulfones, melamine formaldehyde resins, epoxide resins, silicone resins or celluloses. Crosslinking agents may also be employed to enhance the adhesion capacity of the binders. Such crosslinking agents may include, for instance, melamine compounds, masked isocyanates or functional silanes, such as 3-glycidoxypropyltrialkoxysilane, tetraethoxysilane and tetraethoxysilane hydrolysate or crosslinkable polymers, such as polyurethanes, polyacrylates or polyolefins, and subsequent crosslinking.

Dispersion agents may also be employed to facilitate the formation of the conductive polymer coating and the ability to apply it to the metal substrate. Suitable dispersion agents include solvents, such as aliphatic alcohols (e.g., methanol, ethanol, i-propanol and butanol), aliphatic ketones (e.g., acetone and methyl ethyl ketones), aliphatic carboxylic acid esters (e.g., ethyl acetate and butyl acetate), aromatic hydrocarbons (e.g., toluene and xylene), aliphatic hydrocarbons (e.g., hexane, heptane and cyclohexane), chlorinated hydrocarbons (e.g., dichloromethane and dichloroethane), aliphatic nitriles (e.g., acetonitrile), aliphatic sulfoxides and sulfones (e.g., dimethyl sulfoxide and sulfolane), aliphatic carboxylic acid amides (e.g., methylacetamide, dimethylacetamide and dimethylformamide), aliphatic and araliphatic ethers (e.g., diethylether and anisole), water, and mixtures of any of the foregoing solvents. A particularly suitable dispersion agent is water.

Surface-active substances may also be employed in the dispersion, such as ionic or non-ionic surfactants. Furthermore, adhesives may be employed, such as organofunctional silanes or their hydrolysates, for example 3-glycidoxypropyltrialkoxysilane, 3-aminopropyl-triethoxysilane, 3-mercaptopropyl-trimethoxysilane, 3-metacryloxypropyltrimethoxysilane, vinyltrimethoxysilane or octyltriethoxysilane. The dispersion may also contain additives that increase conductivity, such as ether group-containing compounds (e.g., tetrahydrofuran), lactone group-containing compounds (e.g., γ-butyrolactone or γ-valerolactone), amide or lactam group-containing compounds (e.g., caprolactam, N-methylcaprolactam, N,N-dimethylacetamide, N-methylacetamide, N,N-dimethylformamide (DMF), N-methylformamide, N-methylformanilide, N-methylpyrrolidone (NMP), N-octylpyrrolidone, or pyrrolidone), sulfones and sulfoxides (e.g., sulfolane (tetramethylenesulfone) or dimethylsulfoxide (DMSO)), sugar or sugar derivatives (e.g., saccharose, glucose, fructose, or lactose), sugar alcohols (e.g., sorbitol or mannitol), furan derivatives (e.g., 2-furancarboxylic acid or 3-furancarboxylic acid), and alcohols (e.g., ethylene glycol, glycerol, di- or triethylene glycol).

The polymeric dispersion may be applied to the metal substrate using a variety of known techniques, such as by dipping, spin coating, impregnation, pouring, dropwise application, injection, spraying, doctor blading, brushing or printing (e.g., ink-jet, screen, or pad printing). Although it may vary depending on the application technique employed, the viscosity of the dispersion is typically from about 0.1 to about 100,000 mPas (measured at a shear rate of 100 s$^{-1}$), in some embodiments from about 1 to about 10,000 mPas, in some embodiments from about 10 to about 1,500 mPas, and in some embodiments, from about 100 to about 1000 mPas. Once applied, the layer may be dried and washed. Drying may be performed at temperatures of from about −10° C. to about 250° C., and in some embodiments, from about 0° C. to about 200° C. The resulting dried coating may have a thickness of from about 0.2 micrometers ("μm") to about 50 μm, in some embodiments from about 0.5 μm to about 20 μm, and in some embodiments, from about 1 μm to about 5 μm. It should be understood that the thickness of the coating is not necessarily the same at all locations on the metal substrate. Nevertheless, the average thickness of the coating on the substrate generally falls within the ranges noted above.

II. Anode

The anode of the electrolytic capacitor includes a porous body that may be formed from a valve metal composition. The specific charge of the composition may vary. In certain embodiments, for example, compositions having a high specific charge are employed, such as about 5,000 μF*V/g or more, in some embodiments about 25,000 μF*V/g or more, in some embodiments about 40,000 μF*V/g or more, and in some embodiments, from about 70,000 to about 300,000 μF*V/g. The valve metal composition contains a valve metal (i.e., metal that is capable of oxidation) or valve metal-based compound, such as tantalum, niobium, aluminum, hafnium, titanium, alloys thereof, oxides thereof, nitrides thereof, and so forth. For example, the valve metal composition may contain an electrically conductive oxide of niobium, such as niobium oxide having an atomic ratio of niobium to oxygen of 1:1.0±1.0, in some embodiments 1:1.0±0.3, in some embodiments 1:1.0±0.1, and in some embodiments, 1:1.0±0.05. For example, the niobium oxide may be $NbO_{0.7}$, $NbO_{1.0}$, $NbO_{1.1}$, and $NbO_2$. Examples of such valve metal oxides are described in U.S. Pat. No. 6,322,912 to Fife; U.S. Pat. No. 6,391,275 to Fife et al.; U.S. Pat. No. 6,416,730 to Fife et al.; U.S. Pat. No. 6,527,937 to Fife; U.S. Pat. No. 6,576,099 to Kimmel, et al.; U.S. Pat. No. 6,592,740 to Fife, et al.; and U.S. Pat. No. 6,639,787 to Kimmel, et al.; and U.S. Pat. No. 7,220,397 to Kimmel, et al., as well as U.S. Patent Application Publication Nos. 2005/0019581 to Schnitter; 2005/0103638 to Schnitter, et al.; 2005/0013765 to Thomas, et al., all of which are incorporated herein in their entirety by reference thereto for all purposes.

Conventional fabricating procedures may generally be utilized to form the porous anode body. In one embodiment, a tantalum or niobium oxide powder having a certain particle size is first selected. The particles may be flaked, angular, nodular, and mixtures or variations thereof. The particles also typically have a screen size distribution of at least about 60 mesh, in some embodiments from about 60 to about 325 mesh, and in some embodiments, from about 100 to about 200 mesh. Further, the specific surface area is from about 0.1 to about 10.0 $m^2/g$, in some embodiments from about 0.5 to about 5.0 $m^2/g$, and in some embodiments, from about 1.0 to about 2.0 $m^2/g$. The term "specific surface area" refers to the surface area determined by the physical gas adsorption (B.E.T.) method of Bruanauer, Emmet, and Teller, Journal of American Chemical Society, Vol. 60, 1938, p. 309, with nitrogen as the adsorption gas. Likewise, the bulk (or Scott) density is typically from about 0.1 to about 5.0 $g/cm^3$, in some embodiments from about 0.2 to about 4.0 $g/cm^3$, and in some embodiments, from about 0.5 to about 3.0 $g/cm^3$.

To facilitate the construction of the anode body, other components may be added to the electrically conductive particles. For example, the electrically conductive particles may be optionally mixed with a binder and/or lubricant to ensure that the particles adequately adhere to each other when pressed to form the anode body. Suitable binders may include camphor, stearic and other soapy fatty acids, Carbowax (Union Carbide), Glyptal (General Electric), polyvinyl alcohols, naphthalene, vegetable wax, and microwaxes (purified paraffins). The binder may be dissolved and dispersed in a solvent. Exemplary solvents may include water, alcohols, and so forth. When utilized, the percentage of binders and/or lubricants may vary from about 0.1% to about 8% by weight of the total mass. It should be understood, however, that binders and lubricants are not required in the present invention.

The resulting powder may be compacted using any conventional powder press mold. For example, the press mold may be a single station compaction press using a die and one or multiple punches. Alternatively, anvil-type compaction press molds may be used that use only a die and single lower punch. Single station compaction press molds are available in several basic types, such as cam, toggle/knuckle and eccentric/crank presses with varying capabilities, such as single action, double action, floating die, movable platen, opposed ram, screw, impact, hot pressing, coining or sizing. If desired, any binder/lubricant may be removed after compression, such as by heating the formed pellet under vacuum at a certain temperature (e.g., from about 150° C. to about 500° C.) for several minutes. Alternatively, the binder/lubricant may also be removed by contacting the pellet with an aqueous solution, such as described in U.S. Pat. No. 6,197,252 to Bishop, et al., which is incorporated herein in its entirety by reference thereto for all purposes.

The size of the pressed anode body may depend in part on the desired size of the metal substrate. In certain embodiments, the length of the anode body may range from about 1 to about 100 millimeters, in some embodiments from about 5 to about 60 millimeters, and in some embodiments, from about 5 to about 20 millimeters. The width (or diameter) of the anode body may also range from about 0.5 to about 20 millimeters, in some embodiments from about 1 to about 20 millimeters, and in some embodiments, from about 4 to about 10 millimeters. The shape of the anode body may also be selected to improve the electrical properties of the resulting capacitor. For example, the anode body may have a shape that is cylindrical, rectangular, D-shaped, curved, etc.

The anode body may be anodically oxidized ("anodized") so that a dielectric layer is formed over and/or within the anode. For example, a tantalum (Ta) anode may be anodized to tantalum pentoxide ($Ta_2O_5$). Typically, anodization is performed by initially applying a solution to the anode, such as by dipping anode into the electrolyte. A solvent is generally employed, such as water (e.g., deionized water). To enhance ionic conductivity, a compound may be employed that is capable of dissociating in the solvent to form ions. Examples of such compounds include, for instance, acids, such as described below with respect to the electrolyte. For example, an acid (e.g., phosphoric acid) may constitute from about 0.01 wt. % to about 5 wt. %, in some embodiments from about 0.05 wt. % to about 0.8 wt. %, and in some embodiments, from about 0.1 wt. % to about 0.5 wt. % of the anodizing solution. If desired, blends of acids may also be employed.

A current is passed through the anodizing solution to form the dielectric layer. The value of the formation voltage manages the thickness of the dielectric layer. For example, the power supply may be initially set up at a galvanostatic mode until the required voltage is reached. Thereafter, the power supply may be switched to a potentiostatic mode to ensure that the desired dielectric thickness is formed over the entire surface of the anode. Of course, other known methods may also be employed, such as pulse or step potentiostatic methods. The voltage at which anodic oxidation occurs typically ranges from about 4 to about 250 V, and in some embodiments, from about 9 to about 200 V, and in some embodiments, from about 20 to about 150 V. During oxidation, the anodizing solution can be kept at an elevated temperature, such as about 30° C. or more, in some embodiments from about 40° C. to about 200° C., and in some embodiments, from about 50° C. to about 100° C. Anodic oxidation can also be done at ambient temperature or lower. The resulting dielectric layer may be formed on a surface of the anode and within its pores.

III. Electrolyte

The electrolyte is the electrically active material that provides the connecting path between the anode and cathode. Various suitable electrolytes are described in U.S. Pat. Nos. 5,369,547 and 6,594,140 to Evans, et al., which are incorporated herein their entirety by reference thereto for all purposes. Typically, the electrolyte is ionically conductive in that has an ionic conductivity of from about 0.5 to about 1000 milliSiemens per centimeter ("mS/cm"), in some embodiments from about 1 to about 100 mS/cm, in some embodiments from about 5 mS/cm to about 100 mS/cm, and in some embodiments, from about 10 to about 50 mS/cm, determined at a temperature of 25° C. using any known electric conductivity meter (e.g., Oakton Con Series 11). Within the ranges noted above, it is believed that the ionic conductivity of the electrolyte allows the electric field to extend into the electrolyte to a length (Debye length) sufficient to result in significant charge separation. This extends the potential energy of the dielectric to the electrolyte so that the resulting capacitor is able to store even more potential energy than predicted by the thickness of the dielectric. In other words, the capacitor may be charged to a voltage that exceeds the formation voltage of the dielectric. The ratio of the voltage to which the capacitor can be charged to the formation voltage may, for instance, be from about 1.0 to 2.0, in some embodiments from about 1.1 to about 1.8, and in some embodiments, from about 1.2 to about 1.6. As an example, the voltage to which the capacitor is charged may be from about 200 to about 350 V, in some embodiments from about 220 to about 320 V, and in some embodiments, from about 250 to about 300V.

The electrolyte is generally in the form of a liquid, such as a solution (e.g., aqueous or non-aqueous), dispersion, gel, etc. For example, the working electrolyte may be an aqueous solution of an acid (e.g., sulfuric acid, phosphoric acid, or nitric acid), base (e.g., potassium hydroxide), or salt (e.g., ammonium salt, such as a nitrate), as well any other suitable electrolyte known in the art, such as a salt dissolved in an organic solvent (e.g., ammonium salt dissolved in a glycol-based solution). Various other electrolytes are described in U.S. Pat. Nos. 5,369,547 and 6,594,140 to Evans, et al., which are incorporated herein their entirety by reference thereto for all purposes.

The desired ionic conductivity may be achieved by selecting ionic compound(s) (e.g., acids, bases, salts, and so forth) within certain concentration ranges. In one particular embodiment, salts of weak organic acids may be effective in achieving the desired conductivity of the electrolyte. The cation of the salt may include monatomic cations, such as alkali metals (e.g., $Li^+$, $Na^+$, $K^+$, $Rb^+$, or $Cs^+$), alkaline earth metals (e.g., $Be^{2+}$, $Mg^{2+}$, $Ca^{2+}$, $Sr^{2+}$ or $Ba^{2+}$), transition metals (e.g., $Ag^+$, $Fe^{2+}$, $Fe^{3+}$, etc.), as well as polyatomic cations, such as $NH_4^+$. The monovalent ammonium ($NH_4^+$), sodium ($Na^+$), and lithium ($Li^+$) are particularly suitable cations for use in the present invention. The organic acid used to form the anion of the salt is "weak" in the sense that it typically has a first acid dissociation constant ($pK_{a1}$) of about 0 to about 11, in some embodiments about 1 to about 10, and in some embodiments, from about 2 to about 10, determined at 25° C. Any suitable weak organic acids may be used in the present invention, such as carboxylic acids, such as acrylic acid, methacrylic acid, malonic acid, succinic acid, salicylic acid, sulfosalicylic acid, adipic acid, maleic acid, malic acid, oleic acid, gallic acid, tartaric acid (e.g., dextotartaric acid, meso-tartaric acid, etc.), citric acid, formic acid, acetic acid, glycolic acid, oxalic acid, propionic acid, phthalic acid, isophthalic acid, glutaric acid, gluconic acid, lactic acid, aspartic acid, glutaminic acid, itaconic acid, trifluoroacetic acid, barbituric acid, cinnamic acid, benzoic acid, 4-hydroxybenzoic acid, aminobenzoic acid, etc.; blends thereof, and so forth. Polyprotic acids (e.g., diprotic, triprotic, etc.) are particularly desirable for use in forming the salt, such as adipic acid ($pK_{a1}$ of 4.43 and $pK_{a2}$ of 5.41), α-tartaric acid ($pK_{a1}$ of 2.98 and $pK_{a2}$ of 4.34), meso-tartaric acid ($pK_{a1}$ of 3.22 and $pK_{a2}$ of 4.82), oxalic acid ($pK_{a1}$ of 1.23 and $pK_{a2}$ of 4.19), lactic acid ($pK_{a1}$ of 3.13, $pK_{a2}$ of 4.76, and $pK_{a3}$ of 6.40), etc.

While the actual amounts may vary depending on the particular salt employed, its solubility in the solvent(s) used in the electrolyte, and the presence of other components, such weak organic acid salts are typically present in the electrolyte in an amount of from about 0.1 to about 25 wt. %, in some embodiments from about 0.2 to about 20 wt. %, in some embodiments from about 0.3 to about 15 wt. %, and in some embodiments, from about 0.5 to about 5 wt. %.

The electrolyte is typically aqueous in that it contains an aqueous solvent, such as water (e.g., deionized water). For example, water (e.g., deionized water) may constitute from about 20 wt. % to about 95 wt. %, in some embodiments from about 30 wt. % to about 90 wt. %, and in some embodiments, from about 40 wt. % to about 85 wt. % of the electrolyte. A secondary solvent may also be employed to form a solvent mixture. Suitable secondary solvents may include, for instance, glycols (e.g., ethylene glycol, propylene glycol, butylene glycol, triethylene glycol, hexylene glycol, polyethylene glycols, ethoxydiglycol, dipropyleneglycol, etc.); glycol ethers (e.g., methyl glycol ether, ethyl glycol ether, iso-propyl glycol ether, etc.); alcohols (e.g., methanol, ethanol, n-propanol, iso-propanol, and butanol); ketones (e.g., acetone, methyl ethyl ketone, and methyl isobutyl ketone); esters (e.g., ethyl acetate, butyl acetate, diethylene glycol ether acetate, methoxypropyl acetate, ethylene carbonate, propylene carbonate, etc.); amides (e.g., dimethylformamide, dimethylacetamide, dimethylcaprylic/capric fatty acid amide and N-alkylpyrrolidones); sulfoxides or sulfones (e.g., dimethyl sulfoxide (DMSO) and sulfolane); and so forth. Such solvent mixtures typically contain water in an amount from about 40 wt. % to about 80 wt. %, in some embodiments from about 50 wt. % to about 75 wt. %, and in some embodiments, from about 55 wt. % to about 70 wt. % and secondary solvent(s) in an amount from about 20 wt. % to about 60 wt. %, in some embodiments from about 25 wt. % to about 50 wt. %, and in some embodiments, from about 30 wt. % to about 45 wt. %. The secondary solvent(s) may, for example, constitute from about 5 wt. % to about 45 wt. %, in some embodiments from about 10 wt. % to about 40 wt. %, and in some embodiments, from about 15 wt. % to about 35 wt. % of the electrolyte.

If desired, the electrolyte may be relatively neutral and have a pH of from about 4.5 to about 7.0, in some embodiments from about 5.0 to about 6.5, and in some embodiments, from about 5.5 to about 6.0. One or more pH adjusters (e.g., acids, bases, etc.) may be employed to help achieve the desired pH. In one embodiment, an acid is employed to lower the pH to the desired range. Suitable acids include, for instance, inorganic acids, such as hydrochloric acid, nitric acid, sulfuric acid, phosphoric acid, polyphosphoric acid, boric acid, boronic acid, etc.; organic acids, including carboxylic acids, such as acrylic acid, methacrylic acid, malonic acid, succinic acid, salicylic acid, sulfosalicylic acid, adipic acid, maleic acid, malic acid, oleic acid, gallic acid, tartaric acid, citric acid, formic acid, acetic acid, glycolic acid, oxalic acid, propionic acid, phthalic acid, isophthalic acid, glutaric acid, gluconic acid, lactic acid, aspartic acid, glutaminic acid, itaconic acid, trifluoroacetic acid, barbituric acid, cinnamic acid, benzoic acid, 4-hydroxybenzoic acid, aminobenzoic acid, etc.; sulfonic acids, such as methanesulfonic acid, benzenesulfonic acid, toluenesulfonic acid, trifluoromethanesulfonic acid, styrenesulfonic acid, naphthalene disulfonic acid, hydroxybenzenesulfonic acid, etc.; polymeric acids, such as poly(acrylic) or poly(methacrylic) acid and copolymers thereof (e.g., maleic-acrylic, sulfonic-acrylic, and styrene-acrylic copolymers), carageenic acid, carboxymethyl cellulose, alginic acid, etc.; and so forth. Although the total concentration of pH adjusters may vary, they are typically present in an amount of from about 0.01 wt. % to about 10 wt. %, in some embodiments from about 0.05 wt. % to about 5 wt. %, and in some embodiments, from about 0.1 wt. % to about 2 wt. % of the electrolyte.

The electrolyte may also contain other components that help improve the electrical performance of the capacitor. For instance, a depolarizer may be employed in the electrolyte to help inhibit the evolution of hydrogen gas at the cathode of the electrolytic capacitor, which could otherwise cause the capacitor to bulge and eventually fail. When employed, the depolarizer normally constitutes from about 1 to about 500 parts per million ("ppm"), in some embodiments from about 10 to about 200 ppm, and in some embodiments, from about 20 to about 150 ppm of the electrolyte. Suitable depolarizers may include nitroaromatic compounds, such as 2-nitrophenol, 3-nitrophenol, 4-nitrophenol, 2-nitrobenzonic acid, 3-nitrobenzonic acid, 4-nitrobenzonic acid, 2-nitroace tophenone, 3-nitroacetophenone, 4-nitroacetophenone, 2-nitroanisole, 3-nitroanisole, 4-nitroanisole, 2-nitrobenzaldehyde, 3-nitrobenzaldehyde, 4-nitrobenzaldehyde, 2-nitrobenzyl alcohol, 3-nitrobenzyl alcohol, 4-nitrobenzyl alcohol, 2-nitrophthalic acid, 3-nitrophthalic acid, 4-nitrophthalic acid, and so forth. Particularly suitable nitroaromatic depolarizers for use in the present invention are nitrobenzoic acids, anhydrides or salts thereof, substituted with one or more alkyl groups (e.g., methyl, ethyl, propyl, butyl, etc). Specific examples of such alkyl-substituted nitrobenzoic compounds include, for instance, 2-methyl-3-nitrobenzoic acid; 2-methyl-6-nitrobenzoic acid; 3-methyl-2-nitrobenzoic acid; 3-methyl-4-nitrobenzoic acid; 3-methyl-6-nitrobenzoic acid; 4-methyl-3-nitrobenzoic acid; anhydrides or salts thereof; and so forth. Without intending to be limited by theory, it is believed that alkyl-substituted nitrobenzoic compounds may be preferentially electrochemically adsorbed on the active sites of the cathode surface when the cathode potential reaches a low region or the cell voltage is high, and may be subsequently desorbed therefrom into the electrolyte when the cathode potential goes up or the cell voltage is low. In this manner, the compounds are "electrochemically reversible", which may provide improved inhibition of hydrogen gas production.

Figure 1:
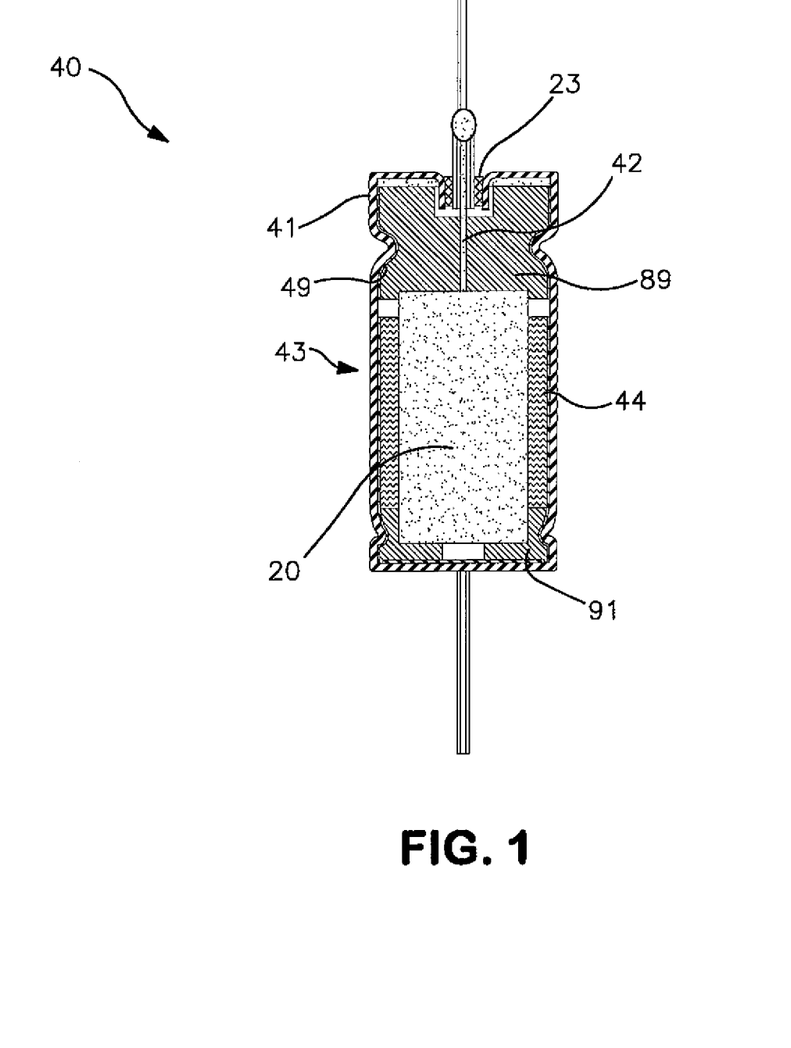
FIG. 1 is a cross-sectional view of one embodiment of the wet electrolytic capacitor of the present invention.

The particular manner in which the components are incorporated into the capacitor is not critical and may be accomplished using a variety of techniques. Referring to FIG. 1, for example, one embodiment of an electrolytic capacitor 40 is shown that includes an electrolyte 44 disposed in electrical contact with an anode 20 and cathode 43. The anode 20 contains a dielectric layer (not shown) and is in electrical contact with a lead 42. The lead 42 may be formed from any electrically conductive material, such as tantalum, niobium, nickel, aluminum, hafnium, titanium, etc., as well as oxides and/or nitrides of thereof. In certain embodiments, electrical contact with the anode 20 may be accomplished by electrically coupling the lead 42 by resistance or laser welding. The cathode 43 is formed from a metal substrate 41, such as described above, and a conductive polymer coating 49. In this embodiment, the cathode substrate 41 is in the form of a cylindrically-shaped "can" with an attached lid.

A liquid seal 23 (e.g., glass-to-metal) may be employed that connects and seals the anode 20 to the cathode 43. An electrically insulating bushing 89 (e.g., polytetrafluoroethylene ("PTFE")) and/or support 91 may also be employed to help stabilize the anode 20 and lead 42 and maintain the desired spacing within the capacitor. If desired, a separator (not shown) may also be positioned between the cathode 43 and anode 20 to prevent direct contact between the anode and cathode, yet permit ionic current flow of the electrolyte 44 to the electrodes. Examples of suitable materials for this purpose include, for instance, porous polymer materials (e.g., polypropylene, polyethylene, polycarbonate, etc.), porous inorganic materials (e.g., fiberglass mats, porous glass paper, etc.), ion exchange resin materials, etc. Particular examples include ionic perfluoronated sulfonic acid polymer membranes (e.g., Nafion™ from the E.I. DuPont de Nemeours & Co.), sulphonated fluorocarbon polymer membranes, polybenzimidazole (PBI) membranes, and polyether ether ketone (PEEK) membranes. Although preventing direct contact between the anode and cathode, the separator permits ionic current flow of the electrolyte to the electrodes.

Regardless of its particular configuration, the capacitor of the present invention may exhibit excellent electrical properties. For example, due in part to high conductivity, the capacitor of the present invention can achieve excellent electrical properties and thus be suitable for use in the capacitor bank of the implantable medical device. For example, the equivalent series resistance ("ESR")—the extent that the capacitor acts like a resistor when charging and discharging in an electronic circuit—may be less than about 1500 milliohms, in some embodiments less than about 1000 milliohms, and in some embodiments, less than about 500 milliohms, measured with a 2-volt bias and 1-volt signal at a frequency of 120 Hz. Likewise, the capacitance may be about 1 milliFarad per square centimeter ("$mF/cm^2$") or more, in some embodiments about 2 $mF/cm^2$ or more, in some embodiments from about 5 to about 50 $mF/cm^2$, and in some embodiments, from about 8 to about 20 $mF/cm^2$.

The electrolytic capacitor of the present invention may be used in various applications, including but not limited to medical devices, such as implantable defibrillators, pacemakers, cardioverters, neural stimulators, drug administering devices, etc.; automotive applications; military applications, such as RADAR systems; consumer electronics, such as radios, televisions, etc.; and so forth. In one embodiment, for example, the capacitor may be employed in an implantable medical device configured to provide a therapeutic high voltage (e.g., between approximately 500 Volts and approximately 850 Volts, or, desirably, between approximately 600 Volts and approximately 900 Volts) treatment for a patient. The device may contain a container or housing that is hermetically sealed and biologically inert. One or more leads are electrically coupled between the device and the patient's heart via a vein. Cardiac electrodes are provided to sense cardiac activity and/or provide a voltage to the heart. At least a portion of the leads (e.g., an end portion of the leads) may be provided adjacent or in contact with one or more of a ventricle and an atrium of the heart. The device also contains a capacitor bank that typically contains two or more capacitors connected in series and coupled to a battery that is internal or external to the device and supplies energy to the capacitor bank. Due in part to high conductivity, the capacitor of the present invention can achieve excellent electrical properties and thus be suitable for use in the capacitor bank of the implantable medical device.

The present invention may be better understood by reference to the following examples.

Test Procedures

All test procedures were measured in conjunction with a cylindrical tantalum anode pressed to a size of 17.3 mm (length)×7.2 mm (diameter) and weight of 4.4 g, and anodized to 10V. The anode exhibited a capacitance of 6.8 mF at a frequency of 120 Hz. The electrolyte was a 5.0 M aqueous solution of sulfuric acid (specific gravity of 1.26 $g/cm^3$). The wet capacitance was determined from following formula:

$$1/C_{wet} = 1/C_{anode} + C_{cathode}$$

Equivalent Series Resistance (ESR)

Equivalence series resistance may be measured using a Keithley 3330 Precision LCZ meter with Kelvin Leads 2.2 volt DC bias and a 0.5 volt peak to peak sinusoidal signal. The operating frequency was 120 Hz and the temperature was 23° C.±2° C.

Wet Capacitance

The capacitance was measured using a Keithley 3330 Precision LCZ meter with Kelvin Leads with 2.2 volt DC bias and a 0.5 volt peak to peak sinusoidal signal. The operating frequency was 120 Hz and the temperature was 23° C.±2° C.

Storage Test

Certain electrical properties (ESR and capacitance) were determined after storage testing. More particularly, 10 samples were filled with 5.0 M aqueous solution of sulfuric acid (specific gravity of 1.26 g/cm$^3$) for 250 hours at ambient temperature. The samples were then tested in the manner described above.

Temperature+Pressure Test:

Certain electrical properties (ESR and capacitance) were determined after temperature and pressure testing. More particularly, 10 samples were put into a pressure cooker filled with 5.0 M aqueous solution of sulfuric acid (specific gravity of 1.26 g/cm$^3$) for 100 hours at 125° C. The samples were then tested in the manner described above.

Example 1

Initially, 100 pieces of cylindrical tantalum cans with a size of 18.3 mm (length)×9.1 mm (internal diameter) were sandblasted with a JetStreem Blaster II (SCM System, Inc.). The sandblasting media was black silicone carbide grit having a size of 63 to 106 μm). The media flow rate was 0.5 grams per second via a 3.2-millimeter blasting nozzle. All pieces of cylindrical tantalum cans were sandblasted to a control level 10.7 millimeters (from potential 18.3 millimeters) using appropriate ferrules. The sandblasting time was 20 seconds. These samples were then degreased in water with surfactants in an ultrasonic bath for 5 minutes, rinsed 3 times in deionized water, and then dried at a temperature of 85° C. for 5 minutes. A conductive polymer coating was applied to the microroughened surface of the tantalum cans by dipping the anode into a dispersed poly(3,4-ethylenedioxythiophene) having a solids content 1.1% (Clevios™ K, H.C. Starck). The tantalum cans were filled to the control level with the dispersed poly (3,4-ethylenedioxythiophene) for five (5) minutes. The samples were drained with a vacuum for up to one (1) minute and put into a drying oven for fifteen (15) minutes at 125° C. The coating cycle was repeated 4 times.

Example 2

100 pieces of cylindrical tantalum cans were sandblasted as described in Example 1. Thereafter, a conductive polymer coating was formed by dipping the cans into a butanol solution of iron (III) toluenesulfonate (Clevios™ C, H.C. Starck) for five (5) minutes and subsequently into 3,4-ethylenedioxythiophene (Clevios™ M, H.C. Starck) for five (5) minutes. The cans were drained using a vacuum for up to one (1) minute and were put into a drying oven for 45 minutes at 30° C. The resulting structure of poly(3,4-ethylenedioxythiophene) was washed in methanol to remove reaction by-products for five (5) minutes and the tantalum cans were put into a drying oven for five (5) minutes at 85° C. This polymerization cycle was repeated (4) times.

Once formed, 10 samples of the cathodes of Examples 1 and 2 were then tested for capacitance and ESR in the manner described above. Furthermore, the capacitance and ESR of the samples was also measured after "storage testing" and "temperature/pressure testing" as described above. The results are shown below in Tables 1 and 2.

TABLE 1

Storage Testing

| Example | Average (before testing) | | Average (after testing) | | | | | |
|---|---|---|---|---|---|---|---|---|
| | CAP (mF) | ESR (mΩ) | CAP (μF) | ESR (mΩ) | ΔCAP (mF) | ΔESR (mΩ) | ΔCAP [%] | ΔESR [%] |
| 1 | 2.53 | 150 | 2.72 | 127 | 0.20 | −22 | 7.7 | −14.9 |
| 2 | 3.48 | 209 | 2.09 | 183 | −1.39 | −26 | −39.9 | −12.4 |

TABLE 2

Temperature/Pressure Testing

| Example | Average (before testing) | | Average (after testing) | | | | | |
|---|---|---|---|---|---|---|---|---|
| | CAP (mF) | ESR (mΩ) | CAP (μF) | ESR (mΩ) | ΔCAP (mF) | ΔESR (mΩ) | ΔCAP [%] | ΔESR [%] |
| 1 | 2.56 | 147 | 2.79 | 120 | 0.23 | −27 | 9.1 | −18.4 |
| 2 | 3.46 | 219 | 2.04 | 194 | −1.42 | −25 | −41.0 | −11.4 |

As indicated, the capacitance values of the sequentially applied conductive polymer coating (Example 2) decreased significantly after testing. In contrast, the capacitance values of the dispersion system (Example 1) actually experienced a slight increase.

These and other modifications and variations of the present invention may be practiced by those of ordinary skill in the art, without departing from the spirit and scope of the present invention. In addition, it should be understood that aspects of the various embodiments may be interchanged both in whole or in part. Furthermore, those of ordinary skill in the art will appreciate that the foregoing description is by way of example only, and is not intended to limit the invention so further described in such appended claims.

What is claimed is:

1. A wet electrolytic capacitor comprising:
   a porous anode body that contains a dielectric layer formed by anodic oxidation;
   a cathode comprising an abrasive blasted, micro-roughened metal substrate, wherein the micro-roughened substrate contains a plurality of pits distributed in a substantially uniform manner on a surface of the substrate, wherein the surface is generally smooth on a macroscopic level, wherein a conductive polymer coating is disposed on the micro-roughened metal substrate that comprises a dispersion of particles having an average diameter of from about 1 to about 500 nanometers, wherein the particles comprise a substituted polythiophene; and
   an electrolyte disposed in electrical contact with the cathode and the anode body.

2. The wet electrolytic capacitor of claim 1, wherein the substituted polythiophene has recurring units of general formula (I) or formula (II) or recurring units of general formulae (I) and (II):

wherein,
  A is an optionally substituted $C_1$ to $C_5$ alkylene radical;
  R is a linear or branched, optionally substituted $C_1$ to $C_{18}$ alkyl radical; optionally substituted $C_5$ to $C_{12}$ cycloalkyl radical; optionally substituted $C_6$ to $C_{14}$ aryl radical; optionally substituted $C_7$ to $C_{18}$ aralkyl radical; optionally substituted $C_1$ to $C_4$ hydroxyalkyl radical, or hydroxyl radical; and
  x is an integer from 0 to 8.

3. The wet electrolytic capacitor of claim 2, wherein A is an optionally substituted $C_2$ to $C_3$ alkylene radical and x is 0 or 1.

4. The wet electrolytic capacitor of claim 1, wherein the substituted is poly(3,4-ethylenedioxythiophene).

5. The wet electrolytic capacitor of claim 1, wherein the dispersion also contains a counterion.

6. The wet electrolytic capacitor of claim 5, wherein the counterion includes a polymeric anion.

7. The wet electrolytic capacitor of claim 6, wherein the polymeric anion is polystyrene sulfonic acid.

8. The wet electrolytic capacitor of claim 6, wherein the weight ratio of counterions to substituted polythiophene in the dispersion is from about 0.5:1 to about 50:1.

9. The wet electrolytic capacitor of claim 8, wherein the weight ratio is from about 2:1 to about 20:1.

10. The wet electrolytic capacitor of claim 1, wherein the particles have an average diameter of from about 10 to about 300 nanometers.

11. The wet electrolytic capacitor of claim 1, wherein the dispersion contains a binder.

12. The wet electrolytic capacitor of claim 1, wherein the coating has a thickness of from about 0.2 μm to about 50 μm.

13. The wet electrolytic capacitor of claim 1, wherein the anode body includes tantalum, niobium, or an electrically conductive oxide thereof.

14. The wet electrolytic capacitor of claim 1, wherein the metal substrate comprises titanium, tantalum, or a combination thereof.

15. The wet electrolytic capacitor of claim 1, wherein the plurality of pits having an average depth of from about 200 to about 2500 nanometers.

16. The wet electrolytic capacitor of claim 1, wherein the plurality of pits having a peak-to-peak distance that ranges from about 30 to about 400 micrometers.

17. The wet electrolytic capacitor of claim 1, wherein the electrolyte is aqueous.

18. The wet electrolytic capacitor of claim 1, wherein the electrolyte has a pH of from about 4.5 to about 7.0.

19. The wet electrolytic capacitor of claim 1, wherein a ratio of the surface area of the surface after abrasive blasting to the surface area of the surface prior to abrasive blasting ranges from about 1 to about 5.

20. A wet electrolytic capacitor comprising:
  a porous anode body that contains a dielectric layer formed by anodic oxidation, where the porous anode body includes tantalum or niobium oxide;
  a cathode comprising an abrasive blasted, micro-roughened metal substrate, wherein the micro-roughened substrate contains a plurality of pits distributed in a substantially uniform manner on a surface of the substrate, wherein the surface is generally smooth on a macroscopic level, wherein a conductive polymer coating is disposed on the micro-roughened metal substrate that comprises a dispersion of particles having an average diameter of from about 1 to about 500 nanometers, wherein the particles comprise poly(3,4-dioxythiophene); and
  an electrolyte disposed in electrical contact with the cathode and the anode body.

21. The wet electrolytic capacitor of claim 20, wherein the particles have an average diameter of from about 10 to about 300 nanometers.

22. The wet electrolytic capacitor of claim 20, wherein the dispersion further contains a polymeric anion.

23. The wet electrolytic capacitor of claim 20, wherein the polymeric anion is polystyrene sulfonic acid.

24. The wet electrolytic capacitor of claim 20, wherein a ratio of the surface area of the surface after abrasive blasting to the surface area of the surface prior to abrasive blasting ranges from about 1 to about 5.

25. The wet electrolytic capacitor of claim 20, wherein the plurality of pits having an average depth of from about 200 to about 2500 nanometers.

26. The wet electrolytic capacitor of claim 20, wherein the plurality of pits having a peak-to-peak distance that ranges from about 30 to about 400 micrometers.

* * * * *

UNITED STATES PATENT AND TRADEMARK OFFICE
CERTIFICATE OF CORRECTION

PATENT NO. : 8,824,121 B2
APPLICATION NO. : 13/192509
DATED : September 2, 2014
INVENTOR(S) : Martin Biler et al.

Page 1 of 1

It is certified that error appears in the above-identified patent and that said Letters Patent is hereby corrected as shown below:

In the Claims

Claim 4 (column 17, l. 31)

"...substituted is..." should read --...substituted polythiophene is...--

Signed and Sealed this
Third Day of February, 2015

Michelle K. Lee
*Deputy Director of the United States Patent and Trademark Office*